United States Patent
Yao et al.

(10) Patent No.: US 11,383,740 B2
(45) Date of Patent: Jul. 12, 2022

(54) WASTE EXHAUST VENTILATION DOOR AUTOMATIC CONTROL DEVICE AND VEHICLE BODY HAVING THE SAME

(71) Applicant: CRRC QINGDAO SIFANG CO., LTD., Shandong (CN)

(72) Inventors: Shuanbao Yao, Shandong (CN); Dawei Chen, Shandong (CN); Conghui Zhang, Shandong (CN); Peng Lin, Shandong (CN); Xin Jiang, Shandong (CN); Yunfeng Li, Shandong (CN); Shaoqing Liu, Shandong (CN); Sansan Ding, Shandong (CN)

(73) Assignee: CRRC QINGDAO SIFANG CO., LTD., Shangdong (CN)

( * ) Notice: Subject to any disclaimer, the term of this patent is extended or adjusted under 35 U.S.C. 154(b) by 200 days.

(21) Appl. No.: 16/628,607

(22) PCT Filed: May 4, 2018

(86) PCT No.: PCT/CN2018/085649
§ 371 (c)(1),
(2) Date: Jan. 3, 2020

(87) PCT Pub. No.: WO2019/037467
PCT Pub. Date: Feb. 28, 2019

(65) Prior Publication Data
US 2020/0156668 A1   May 21, 2020

(30) Foreign Application Priority Data
Aug. 22, 2017   (CN) .......................... 201710725860.5

(51) Int. Cl.
B61D 27/00    (2006.01)
B60H 1/24    (2006.01)

(52) U.S. Cl.
CPC ....... B61D 27/0009 (2013.01); B61D 27/009 (2013.01); *B60H 1/249* (2013.01)

(58) Field of Classification Search
CPC ... B60H 1/249; B61D 27/009; B61D 27/0009
(Continued)

(56) References Cited

U.S. PATENT DOCUMENTS

2005/0199845 A1 *   9/2005   Jones .................... F16K 15/033
251/129.06

FOREIGN PATENT DOCUMENTS

CN   201296248         8/2009
CN   201296248 Y *    8/2009
(Continued)

OTHER PUBLICATIONS

PCT/CN2018/085649, International Search Report and Written Opinion with English Translations, dated Aug. 8, 2018, 14 pages.

*Primary Examiner* — Allen R. B. Schult
(74) *Attorney, Agent, or Firm* — Stoel Rives LLP

(57) ABSTRACT

A waste exhaust ventilation door automatic control device comprises a core body (8), an inner door body (2) and an outer door body (1); wherein the core body is fixed on a ventilation opening of the waste exhaust ventilation door, a top of the outer door body is movably hinged on an outer side of the core body, and a bottom of the inner door body is movably hinged on an inner side of the core body; when there is no pressure fluctuation outside the core body, the outer door body and inner door body will open, and when there is pressure fluctuation outside the core body, the outer door body and/or the inner door body will be closed automatically due to a pressure difference between inside and outside the core body. A vehicle body comprising the waste exhaust ventilation door automatic control device is also provided.

10 Claims, 3 Drawing Sheets

(58) Field of Classification Search
USPC .......................................................... 454/70
See application file for complete search history.

(56) References Cited

FOREIGN PATENT DOCUMENTS

| | | |
|---|---|---|
| CN | 103287447 | 9/2013 |
| CN | 203372242 | 1/2014 |
| CN | 203485925 | 3/2014 |
| CN | 204548127 | 8/2015 |
| CN | 204895472 | 12/2015 |
| CN | 105539476 A | 5/2016 |
| CN | 106564513 A | 4/2017 |
| CN | 107600093 A | 1/2020 |
| DE | 102005010179 A1 | 9/2006 |
| EP | 1466802 A1 | 10/2014 |
| JP | 2620569 | 5/1991 |
| JP | 2001199220 | 7/2001 |
| KR | 1020080030987 | 4/2008 |
| TW | 197988 | 1/1993 |
| WO | 2019037467 A1 | 2/2019 |

\* cited by examiner

WASTE EXHAUST VENTILATION DOOR AUTOMATIC CONTROL DEVICE AND VEHICLE BODY HAVING THE SAME

CROSS-REFERENCE TO RELATED APPLICATION

This application is a United States National Phase entry of International Appl. No. PCT/CN2018/085649, filed May 4, 2018, which claims priority to Chinese patent application No. 2017107258605 filed on Aug. 22, 2017, entitled by "Waste Exhaust Ventilation Door Automatic Control Device and Vehicle Body Having the Same", the disclosure of both of which are incorporated herein by reference in their entirety.

FIELD OF TECHNOLOGY

The present disclosure relates to the technical field of rail vehicle equipment, and particularly to a waste exhaust ventilation door automatic control device and a vehicle body having the same.

BACKGROUND

During the operations of rail vehicles, urban rail and subway vehicles need to continuously pass through complex passage conditions and structures such as tunnels, platforms, viaducts and ventilation shafts. With the increase of the speed of urban rail and subway vehicles, the aerodynamic effect becomes more prominent, and the pressure fluctuation outside the carriage becomes more obvious. If the vehicle is not airtightly designed, the ride comfort will be significantly reduced, and the pressure fluctuations inside the carriage will fail to meet the design requirements.

In order to improve the airtight performance of the vehicles, key parts of the vehicles need to be airtightly designed. While the existing waste exhaust devices of the urban rail and subway vehicles have not been airtightly designed, although the waste exhaust structure of the D-Series high-speed train is airtightly designed, the structure is complex, and is hard to be applied directly onto the urban rail and subway vehicles.

SUMMARY

Technical Problems to be Solved

The present disclosure provides a waste exhaust ventilation door automatic control device and a vehicle body having the same. The device is capable of automatically controlling the opening and closing of the waste exhaust ventilation door on the vehicle body by the pure mechanical structure according to the fluctuation characteristic of the pressure fluctuation outside the vehicle, so as to weaken the influence of the pressure outside the vehicle on the pressure variation inside the vehicle, and effectively improve the airtight performance of the vehicle body.

Technical Solutions

In order to solve the technical problem above, the present disclosure provides a waste exhaust ventilation door automatic control device comprising a core body, inner door bodies and outer door bodies; wherein the core body is fixed on a ventilation opening of the waste exhaust ventilation door, a top of the outer door body is movably hinged on an outer side of the core body, and a bottom of the inner door body is movably hinged on an inner side of the core body; when there is no pressure fluctuation on the outer side of the core body, the outer door body and inner door body are open, and when there is pressure fluctuation on the outer side of the core body, the outer door body and/or the inner door body are closed automatically due to a pressure difference between the inner side and outer side of the core body.

Preferably, in case there is pressure fluctuation on the outer side of the core body, when an air pressure outside the core body is greater than that inside the core body, the outer door body is closed;

when the air pressure outside the core body is smaller than that inside the core body, the inner door body is closed;

when the air pressure outside the core body is equal to that inside the core body, the outer door body and the inner door body are closed.

Preferably, when there is no pressure fluctuation on the outer side of the core body, an air pressure inside the core body is in a slight positive pressure state.

Preferably, the slight positive pressure state is an air pressure of 30 Pa-50 Pa.

Preferably, the core body comprises a core plate and brackets, wherein the core plate communicates with the ventilation opening of the waste exhaust ventilation door, two brackets respectively stand on the core plate oppositely, an outer side of each bracket is movably hinged to the top of one outer door body, and an inner side of each bracket is movably hinged to the bottom of one inner door body, when the outer door body and/or the inner door body are closed, the outer door body and/or the inner door body are connected hermetically with the bracket respectively.

Preferably, when the outer door body is opened, a door body opening angle between the outer door body 1 and the bracket is determined according to an air volume of the ventilation opening and a weight of the outer door body.

Preferably, when the inner door body is opened, a door body opening angle between the inner door body and the bracket is determined according to an air volume of the ventilation opening and a weight of the inner door body.

Preferably, the bracket is provided with sealing gaskets respectively on the inner side and outer side thereof.

Preferably, it further comprises a cover body, an air duct is formed between the cover body and the core boy, two ends of the air duct are provided with vents respectively.

Preferably, the cover body is in an arc shape so that the two vents are disposed downwards.

Preferably, a filter plate is fixed on the vent.

Preferably, a rain baffle is fixed outside the filter plate.

Preferably, the cover body and the core body are connected by a support rod.

The present disclosure also provides a vehicle body comprising the above waste exhaust ventilation door automatic control device.

Beneficial Effects

The above technical solution of the present disclosure has the following beneficial effects:

1. The waste exhaust ventilation door on the vehicle body of the device can automatically open and close according to the fluctuation characteristics of the pressure fluctuation outside the vehicle with a mechanical structure only, thereby weakening the influence of the pressure fluctuation outside the vehicle on the pressure change inside the vehicle, and effectively improve the airtight performance of the vehicle body, and the greater the pressure fluctuation, the better the airtight effect of the device;

2. The device employs a mechanical structure to automatically open and close the outer door body and the inner door body without any control device, and is simple in design and manufacture, easy to maintain, and has flexible interface modes that can be applied to different types of urban rail and subway vehicles;

3. The device uses the structure of the core body to arrange the exhaust door as a multi-duct structure simultaneously ventilating on both sides. Under the premise of ensuring the airtightness of the vehicle body, the air exchange between the vehicle body and the outside is smoother when the outer door body and the inner door body in each duct are opened at the same time;

4. The device can meet the different design requirements of airtight and exhaust volume by changing the weight of the outer door body and the inner door body, the door body opening displacement and the door body opening angle;

5. The device adopts a streamline design, by designing the arc cover body, when the device is installed on the waste exhaust ventilation door of the vehicle body, it can be integrated with the appearance of the vehicle body, and under the premise of meeting the requirement of preventing leakage of rain, the aerodynamic resistance of the waste exhaust ventilation door is reduced to some extent, and the higher the operating speed of the vehicle, the more obvious the resistance reduction effect.

DESCRIPTION OF THE REFERENCE NUMBERS

| 1 outer door body | 2 inner door body |
|---|---|
| 3 cover body | 4 core plate |
| 5 support rod | 6 filter rod |
| 7 rain baffle | 8 core body |
| 81 core plate | 82 bracket |
| α door body opening angle | |

DESCRIPTION OF THE EMBODIMENTS

The implementations of the present disclosure will be further described in detail hereinafter with reference to the accompanying drawings and embodiments. The following embodiments are used to illustrate the present disclosure, but cannot be used to limit the scope thereof.

In the description of the present disclosure, unless specified otherwise, term "a plurality of" means two or more. The orientation or position relations indicated by terms such as "upper", "lower", "left", "right", "inner", "outer", "front end" and "rear end", are based on the orientation or position relations illustrated in the accompanying drawings, which is only for the convenience of illustrating the present disclosure and simplifying the description, and does not indicate or imply that the designated device or element must have a specific orientation, or be constructed and operated in a specific orientation, therefore cannot be construed as a limitation of the present disclosure.

Figure 1:
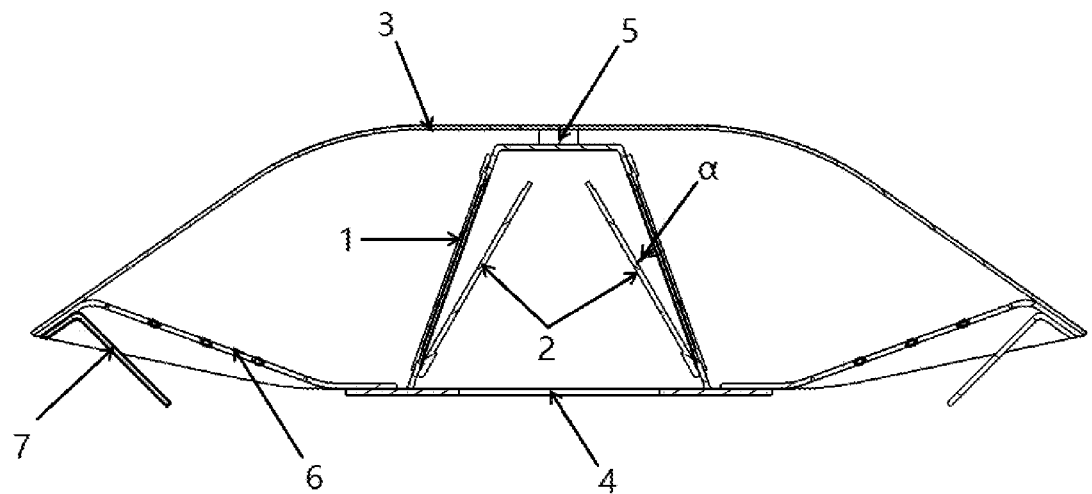
FIG. 1 is a sectional view of the waste exhaust ventilation door automatic control device according to an embodiment of the present disclosure.

As shown in FIG. 1, the waste exhaust ventilation door automatic control device provided by the present embodiment is in a mechanical structure, which is capable of automatically opening and closing the waste exhaust ventilation door on the vehicle body by mechanical structure only according to the fluctuation characteristic of the pressure fluctuation outside the vehicle, so as to weaken the influence of the pressure outside the vehicle on the pressure variation inside the vehicle, and effectively improve the airtight performance of the vehicle body. The main purpose thereof is to prevent the violent fluctuation of the pressure inside the vehicle caused by the violent fluctuation of the pressure outside the vehicle. For a well airtightly designed vehicle body, the violent fluctuation of the pressure outside the vehicle will not cause the violent fluctuation of the pressure inside the vehicle.

Figure 2:
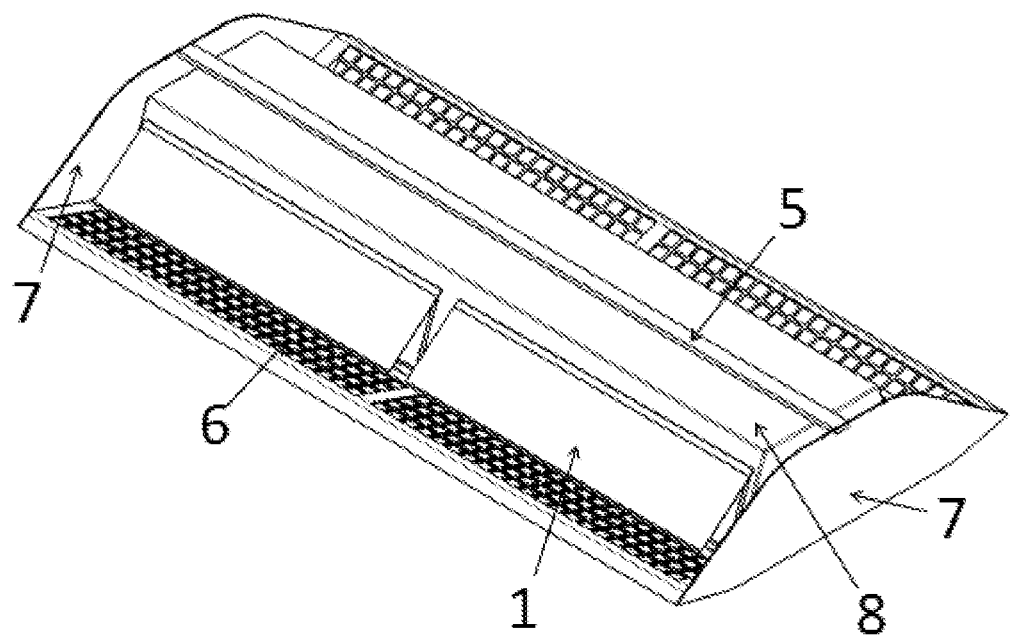
FIG. 2 is a structural diagram of the waste exhaust ventilation door automatic control device without the cover body according to an embodiment of the present disclosure.

Specifically, as shown in FIG. 2, the device includes a core body 8, inner door bodies 2 and outer door bodies 1. The core body 8 is fixed on the waste exhaust ventilation door. The top of the outer door body 1 is movably hinged on the outer side of the core body 8. The bottom of the inner door body 2 is movably hinged on the inner side of the core body 8. Preferably, the outer door body 1 and the inner door body 2 are respectively hinged on the inner and outer side of the core body 8 by a hinge mechanism, so that the outer door body 1 can be lifted with its top as an axis, and the inner door 2 can be opened with its bottom as an axis.

Figure 3:
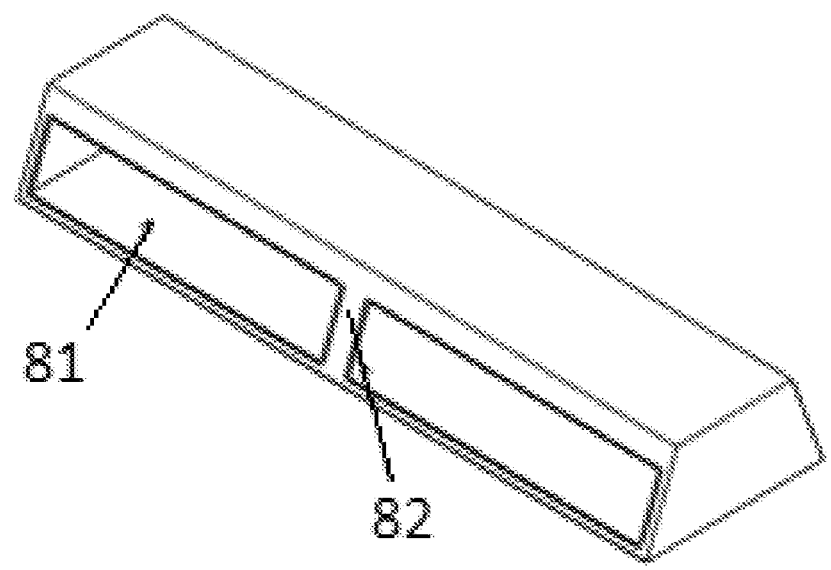
FIG. 3 is a frame structural diagram according to an embodiment of the present disclosure.

As shown in FIG. 3, the core body 8 of the present embodiment is the main supporting structure, the interior thereof is hollow. The bottom is provided with an opening installed on the ventilation door of the waste exhaust ventilation door, so that the air can enter and exit the ventilation door of the waste exhaust ventilation door through the opening at the bottom of the core body 8. Preferably, the core body 8 includes a core plate 81 and a bracket 82. The opening provided on the core plate 81 communicates with the ventilation door of the waste exhaust ventilation door, two brackets 82 respectively stand on the core plate 81 oppositely. The outer side of each bracket 82 is movably hinged to the top of an outer door body 1, and the inner side of each bracket 82 is movably hinged to the bottom of an inner door body 2, so that the two brackets 82 serve as two air duct openings for the air entering and exiting the waste exhaust ventilation door.

Preferably, both of the brackets 82 stand and incline inwardly on both sides of the core plate 81, so that the core 8 has a trapezoidal structure as a whole. When the inner door body 2 and the outer door body 1 on each bracket 82 are opened, the air can smoothly enter and exit from the two air duct openings, which is more conducive to the air exchange between the inside and outside of the vehicle body. When the outer door body 1 and/or the inner door body 2 are closed, the outer door body 1 or the inner door body 2 is sealedly connected with the bracket 82 respectively, so as to ensure the airtightness of the air duct opening; when the outer door body 1 is opened, the door body opening angle α between the outer door body 1 and the bracket 82 is determined according to the air volume of the ventilation opening and the weight of the outer door body 1; when the inner door body 2 is opened, the door body opening angle α between the inner door body 2 and the bracket 82 is determined according to the air volume of the ventilation opening and the weight of the inner door body 2.

In order to ensure the airtightness of the device when the outer door body 1 and the inner door body 2 are closed, it is preferable that the brackets 82 are provided with sealing gaskets on both the inner and outer sides thereof. It is further preferable that the edge of the air duct opening is provided with an embedding groove in which a sealing gasket is mounted, in this way, when the outer door body 1 is closed outside the air duct opening, it can be embedded on the sealing gasket outside the air duct opening so as to ensure the sealing between the outer door body 1 and the air duct opening of the bracket 82; similarly, an embedding groove may be also provided on the inner side of the air duct opening, such that when the inner door body 2 is closed inside the air duct opening, it can be embedded on the sealing gasket inside the air duct opening so as to ensure the sealing between the inner door body 2 and the air duct opening of the bracket 82.

In order to further ensure the air exchange, it is further preferable that a plurality of air duct openings are arranged side by side on the bracket 82, the inner side and outer side of each air duct opening is movably hinged with the outer door body 1 and inner door body 2 respectively. The number of the outer door body 1 and the number of the inner door body 2 are equal to that of the air duct openings on the bracket 82, and the sizes are greater than the size of the air duct opening, the size of the outer door body 1 and the size of the inner door body 2 may be the same or may not be the same; in order to ensure the stability of the structure, the edges of the air duct openings are preferably to be thickened.

Preferably, the device of the present embodiment further includes a cover body 3 so as to prevent the rain and snow from directly covering the core body 8 to affect the air circulation. An air duct is formed between the cover body 3 and the core body 8. The two ends of the air duct are provided with vents respectively; preferably, the cover body 3 and the core body 8 are connected by a support rod 5 to enhance the structural stability of the device, and provide a reliable support for the cover body 3.

Preferably, the cover body 3 is arranged in an arc shape so that the two vents are disposed downwards, and the streamlined design enables the device to be integrated with the appearance of the vehicle body when the device is installed on the waste exhaust ventilation door of the vehicle body. Under the premise of satisfying the requirement of preventing rain leakage, the aerodynamic resistance of the waste exhaust ventilation door is reduced to a certain extent, and the higher the vehicle speed is, the more obvious the resistance reduction effect is.

In order to prevent the external debris from entering the core body 8 through the vent, it is preferable that a filter plate 6 is fixed on each vent. The number of meshes of the filter plate 6 can be determined according to actual needs, and a rain baffle 7 is fixed outside the filter plate 6, one side of the rain baffle 7 is fixed on the cover body 3, and the other side protrudes inwardly and downwardly, so that the left rainwater or melted snow water can be led to the ground along the cover body 3 to prevent water from entering into the vent.

The device of the present embodiment can control the opening and closing of the outer door body 1 and inner door body 2 automatically, according to the fluctuation characteristic of the pressure fluctuation. When there is no pressure fluctuation outside the core body 8, the outer door body 1 and inner door body 2 are open; and when there is pressure fluctuation outside the core body 8, the outer door body 1 and/or the inner door body 2 are hermetically closed automatically due to the pressure difference between the inside and outside of the core body 8. The specific control principle is as follows:

(1) Under the operating conditions without pressure fluctuation interference outside the vehicle body, the pressure inside the vehicle is in a slight positive pressure state (30 Pa-50 Pa in general); and the air pressure inside the core body 8 is in a slight positive pressure state. In such case, the inner door body 2 is in an open state under the gravity, and the outer door body 1 is in an open state of different degrees according to the air volume passing through the ventilation opening, wherein the open state includes the door body opening angle α and the door body opening duration.

In other words, the door body opening angle α between the outer door body 1 and the bracket 82 is determined according to the air volume of the ventilation opening and the weight of the outer door body 1; and the door body opening angle α between the inner door body 2 and the bracket 82 is determined according to the air volume entering and exiting the ventilation opening and the weight of the inner door body 2; similarly, the door body opening angle α between the outer door body 1 and the bracket 82 is determined according to the air volume entering and exiting the ventilation opening and the weight of the outer door body 1.

(2) When a momentary pressure difference occurs between the interior and exterior of the vehicle, that is, when there is a pressure fluctuation interference outside the vehicle body, in case the external pressure is greater than the internal pressure, the outer door body 1 is momentarily closed due to the pressure difference between the inner and outer side of the core body 8, while the inner door body 2 keeps open. In such case, the ventilation openings of the waste exhaust ventilation door prevent the pressure outside the vehicle from passing through the waste exhaust device to the interior of the vehicle body due to the closed outer door body 1, so that the airtightness of the vehicle body is ensured meanwhile the pressure fluctuation outside the vehicle interfering the pressure state inside the vehicle body is avoided.

(3) When a momentary pressure difference occurs between the interior and exterior of the vehicle, in case the pressure difference between the inner and outer side of the core body 8 is greater than the gravity of the inner door body 2, the inner door body 2 is momentarily closed. In such case, the ventilation openings of the waste exhaust ventilation door prevent the pressure outside the vehicle from passing through the device to the interior of the vehicle body due to the closed inner door body 2, so that the airtightness of the vehicle body is ensured meanwhile the pressure fluctuation outside the vehicle interfering the pressure state inside the vehicle body is avoided.

(4) When a momentary pressure difference occurs between the interior and exterior of the vehicle, in case the internal pressure is equal to the external pressure, that is, the inside and outside of the core body 8 are subjected to sufficient pressure at the same time, and the pressure inside the core body 8 is greater than the gravity of the inner door body 2, the outer door body 1 and the inner door body 2 are closed momentarily. In such case, the ventilation openings of the waste exhaust ventilation door prevent the pressure outside the vehicle from passing through the device to the interior of the vehicle body due to the simultaneously closed outer door body 1 and inner door body 2, so that the airtightness of the vehicle body is ensured meanwhile the pressure fluctuation outside the vehicle interfering the pressure state inside the vehicle body is avoided.

According to the control principle above, the outer door body 1 and inner door body 2 of the embodiment are specifically required: wherein, the weight of the outer door body 1 is determined by the strength of the slight positive pressure inside the vehicle, and the slight positive pressure required by the vehicle design should ensure that the outer door body 1 can be pushed open, so that the device can smoothly exhaust air, and the outer door body 1 should have sufficient strength so that the outer door body 1 will not deformed under the internal and external pressure difference of the vehicle body; the weight of the inner door body 2 is determined according to the pressure fluctuation, for example, the pressure fluctuation is 200 Pa/s, 415 Pa/s or 800 Pa/s. During operation, if the pressure fluctuation is within the range of the design requirement, when the inner door body 2 opens, the door body opening angle α is determined by the waste exhaust air volume of the vehicle body, and the waste exhaust air volume of the vehicle body is the air volume passing through a ventilation opening of the waste exhaust ventilation door.

The present embodiment also provides a vehicle body including the waste exhaust ventilation door automatic control device above. The vehicle body equipped with the device above has great airtightness, and the violent fluctuates of the pressure outside the vehicle will not cause that of the pressure inside the vehicle. Studies have shown that when the pressure inside the vehicle changes violently, passengers may suffer from uncomfortable feelings such as tinnitus, nausea, etc. Therefore, in the vehicle body design process, the change rate of the pressure inside the vehicle must be fully taken into consideration. There are many defined values of the change rate of the pressure, taking 200 Pa/s as an example, it means that within 1 s, the difference between the maximum pressure and the minimum pressure is 200 Pa.

A test example is provided below to describe in detail that the vehicle body mounted with the above-described device has excellent airtightness.

In order to verify the effectiveness of the above embodiment, it is assumed that the vehicle is a completely sealed vehicle body, and a carriage is simplified as a rectangular sealed box, and a mechanical waste exhaust device is installed outside the sealed box. Three test examples are compared and analyzed using simulation methods: neither the inner door body 2 nor the outer door body 1 is provided, only the outer door body 1 is provided, and both the inner door body 2 and the outer door body 1 are provided. Wherein, a pressure measuring point is set in the sealed box, and a time-dependent pressure fluctuation is given in the external field area (this pressure fluctuation is the pressure fluctuation generated when the vehicle passes through the tunnel).

Figure 4:
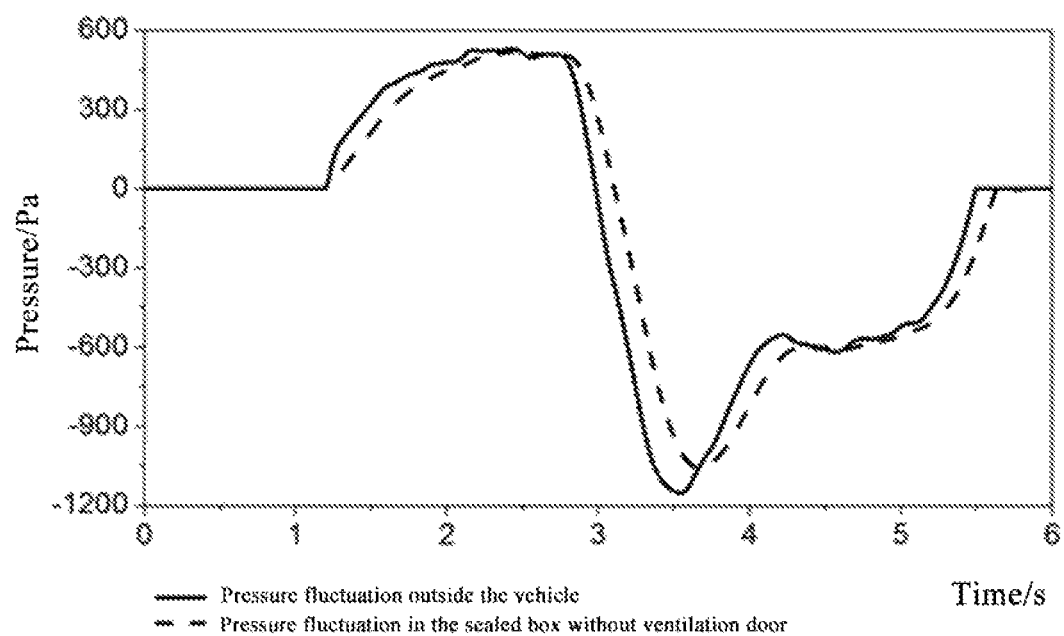
FIGS. 4-6 are comparison diagrams of the pressure variation values of the pressure measuring points in a vehicle body airtightness test of the waste exhaust ventilation door automatic control device and the device in a test comparison example, according to an embodiment of the present disclosure.
Figure 5:
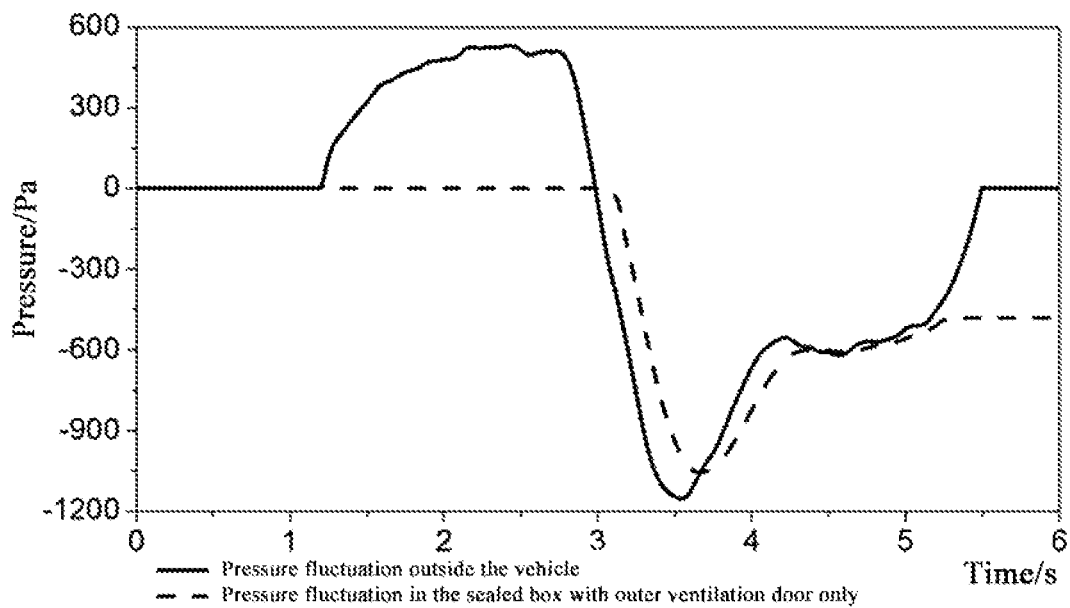
Figure 6:
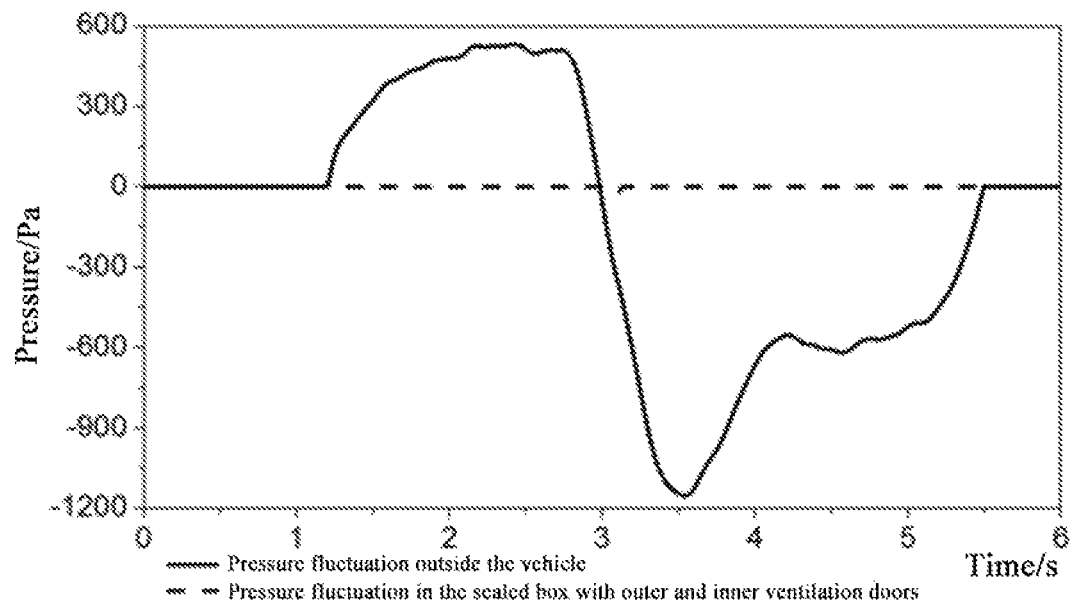

The pressure variation values of the pressure measuring point in the sealed box in each test example are shown in FIGS. 4 to 6. It can be seen that, as shown in FIG. 4, when neither the inner door body 2 nor the outer door body 1 is provided (that is, no ventilation door is provided). The pressure fluctuation in the external field area passes through the ventilation openings of the waste exhaust ventilation door and enters the sealed box. The pressure fluctuation in the sealed box and the pressure fluctuation in the external field area have little difference in fluctuation amplitude, that is, if the sealed box is the vehicle body, the passengers in the vehicle body will feel the same pressure change as the pressure fluctuation, which is very disadvantageous to the safety of the passengers. As shown in FIG. 5, when only the outer door body 1 is provided, if the pressure fluctuation in the external field area is positive pressure (that is, the pressure is greater than 0), the outer door body 1 is closed and there is no pressure fluctuation in the sealed box, when the pressure fluctuation in the outer field is negative pressure (that is, the pressure is less than 0), the outer door body 1 is opened, and the negative pressure of the external field area is introduced into the sealed box. The absolute value of the negative pressure in the sealed box is greater than that of the negative pressure in the external field area as the absolute value of the negative pressure in the external field area gradually decreases. In such case, the outer door body 1 is closed again and the negative pressure in the sealed box cannot be exhausted; and the negative pressure state keeps but the pressure value is constant. Therefore, if the sealed box is the vehicle body, the passengers in the vehicle body will be under a negative pressure state, which is also disadvantageous to the safety and comfort of the passengers. As shown in FIG. 6, when the inner door body 2 and outer door body 1 are provided at the same time, if the pressure fluctuation in the external field area is positive pressure, the outer door body 1 is closed and there is no pressure fluctuation in the sealed box. When the pressure fluctuation in the external field area is negative pressure, the inner door body 2 is closed; and there is still no pressure fluctuation in the sealed box, that is, through the successive closing of the inner and outer door body 1, the pressure fluctuation in the external field area cannot be introduced into the sealed box. Therefore, if the sealed box is the vehicle body, the passengers inside the vehicle body are in a nearly constant pressure state, which will have great comfort and safety.

According to the above experimental comparison, it can be verified that the above-mentioned waste exhaust ventilation door automatic control device for has very excellent sealing performance, so that the vehicle body mounted with the device has very excellent airtightness. It should be noted that the better the sealing performance of the vehicle body, the better the sealing effect of the device will be. If the vehicle body is a completely sealed vehicle, that is, having the same sealing effect as the sealing box, the sealing effect of the device is the best.

In summary, the device of the present embodiment and the vehicle body having the device above have the following beneficial effects:

1. The waste exhaust ventilation door of the device on the vehicle body can automatically open and close according to the fluctuation characteristics of the pressure fluctuation outside the vehicle through a pure mechanical structure, thereby weakening the influence of the pressure fluctuation outside the vehicle on the pressure change inside the vehicle, and effectively improve the airtight performance of the vehicle body, and the greater the pressure fluctuation, the better the airtight effect of the device;

2. The device adopts a mechanical structure to automatic open and close the outer door body 1 and the inner door body 2 without any control device, it is simple in design and manufacture, easy to maintain, and has flexible interface modes and can be applied to different types of urban rail and subway vehicles;

3. The device uses the structure of the core body 8 to arrange the exhaust door as a multi-duct structure simultaneously ventilating on both sides. Under the premise of ensuring the airtightness of the vehicle body, the air exchange between the vehicle body and the outside is smoother when the outer door body 1 and the inner door body 2 in each duct are opened at the same time.

4. The device can meet the different design requirements of airtight and exhaust volume by changing the weight of the outer door body 1 and the inner door body 2, the door body opening displacement and the door body opening angle α.

5. The device adopts a streamline design, by designing the arc cover body 3. When the device is installed on the waste exhaust ventilation door of the vehicle body, it can be integrated with the appearance of the vehicle body, and under the premise of meeting the requirement of preventing leakage of rain, the aerodynamic resistance of the waste exhaust ventilation door is reduced to some extent, and the higher the operating speed of the vehicle, the more obvious the resistance reduction effect.

The embodiments of the present disclosure are presented for the purpose of illustration and description, but are not exhaustive or limiting the present disclosure to the disclosed forms. Many modifications and variations will be apparent to those of ordinary skill in the art. The embodiments are selected and described in order to better explain the principles and practical applications of the present disclosure, and to enable those of ordinary skill in the art to understand the present disclosure, so as to design the various embodiments that have various modifications and are suitable for specific use.

The invention claimed is:

1. A waste exhaust ventilation door automatic control device, comprising:
    a core body, one or more inner door bodies and a plurality of outer door bodies; the core body is fixed on a ventilation opening of a waste exhaust ventilation door, a top of each outer door body is movably hinged on an outer side of the core body, and a bottom of each inner door body is movably hinged on an inner side of the core body; when there is no pressure fluctuation outside the core body, each outer door body and inner door body will open, and when there is pressure fluctuation outside the core body, each outer door body and/or each inner door body will be closed automatically due to a pressure difference between inside and outside the core body;
    wherein when there is no pressure fluctuation outside the core body, an air pressure inside the core body is 30 Pa-50 Pa and is smaller than an air pressure inside the core body when outside pressure fluctuation occurs;
    wherein in case there is pressure fluctuation outside the core body, each outer door body is closed when an air pressure outside the core body is greater than an air pressure inside the core body; each inner door body is closed when the air pressure outside the core body is smaller than the air pressure inside the core body; and the outer door bodies and the inner door bodies are both closed when the air pressure outside the core body is equal to the air pressure inside the core body; and
    wherein the core body comprises a core plate and brackets, wherein the core plate communicates with the ventilation opening of the waste exhaust ventilation door, two brackets respectively stand on the core plate oppositely, an outer side of each bracket is movably hinged to the top of one outer door body, and an inner side of each bracket is movably hinged to the bottom of one inner door body, when at least one of the outer door bodies and at least one of the inner door bodies are closed, the at least one of the outer door bodies and at least one of the inner door bodies are connected hermetically with the bracket respectively.

2. The waste exhaust ventilation door automatic control device of claim 1, wherein when the outer door bodies are opened, a door body opening angle between the respective outer door body and one of the brackets is determined according to an air volume of the ventilation opening and a weight of the respective outer door body.

3. The waste exhaust ventilation door automatic control device of claim 1, wherein when the inner door bodies are opened, a door body opening angle between the respective inner door body and one of the brackets is determined according to an air volume of the ventilation opening and a weight of the respective inner door body.

4. The waste exhaust ventilation door automatic control device of claim 1, wherein one of the brackets is provided with sealing gaskets respectively on the inner side and outer side thereof.

5. The waste exhaust ventilation door automatic control device of claim 1, further comprising a cover body, wherein an air duct is formed between the cover body and the core body, and two ends of the air duct are provided with vents respectively.

6. The waste exhaust ventilation door automatic control device of claim 5, wherein the cover body is in an arc shape so that the two vents are disposed downwards.

7. The waste exhaust ventilation door automatic control device of claim 5, wherein a filter plate is fixed on one of the vents.

8. The waste exhaust ventilation door automatic control device of claim 7, wherein a rain baffle is fixed outside the filter plate.

9. The waste exhaust ventilation door automatic control device of claim 5, wherein the cover body and the core body are connected by a support rod.

10. A vehicle body, comprising the waste exhaust ventilation door automatic control device of claim 1.

* * * * *